July 22, 1969  E. L. JOSEFOWICZ ET AL  3,457,086
LOW-FAT TABLE SPREAD COMPOSITIONS
Filed March 27, 1967  3 Sheets-Sheet 1

INVENTORS.
EDMUND L. JOSEFOWICZ
IRWIN COOPER
DANIEL MELNICK
BY
ATTYS.

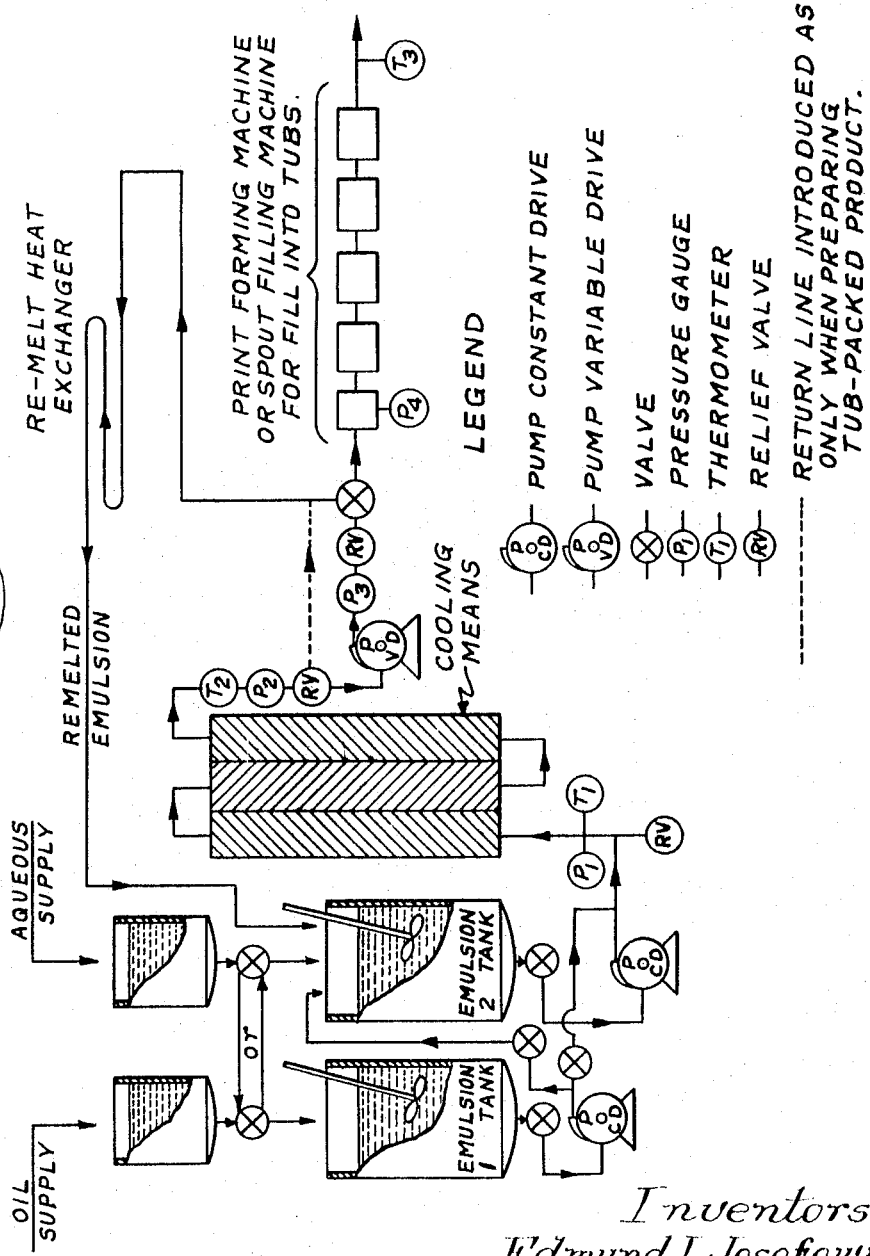

//  # United States Patent Office 3,457,086
Patented July 22, 1969

3,457,086
LOW-FAT TABLE SPREAD COMPOSITIONS
Edmund L. Josefowicz, Bayonne, N.J., Irwin Cooper, Staten Island, N.Y., and Daniel Melnick, Teaneck, N.J., assignors to Corn Products Company, New York, N.Y., a corporation of Delaware
Continuation-in-part of application Ser. No. 437,017, Mar. 4, 1965. This application Mar. 27, 1967, Ser. No. 634,016
Int. Cl. A23d 3/02
U.S. Cl. 99—123                4 Claims

ABSTRACT OF THE DISCLOSURE

The subject relates to a novel low-fat table spread which may be manufactured in either print form or soft tub form. The table spread is substantially free of protein, contains less than 50% fat and is a stable water-in-oil emulsion. Observance of specified conditions of temperature, agitation and pressure is essential to prevent the emulsion changing to an oil-in-water type. The table spread is made without need to use ingredients other than those now commonly used in margarine and it possesses all desirable organoleptic characteristics of margarine but provides much less calories.

---

This application is a continuation-in-part of copending application U.S. Ser. No. 437,017 filed Mar. 4, 1965, now abandoned.

MANUFACTURE OF PRINT FORM OF TABLE SPREAD

This invention relates to a novel low-fat table spread and to a process for continuously manufacturing a low-fat table spread wherein an initially established matrix of a margarine fat containing a dispersed aqueous phase is thereafter caused to perpetuate itself by blending the established plastic emulsion with incoming, non-crystallized emulsion of the same components; said process also being characterized by the pressure of the plastic emulsion issuing from the cooling units being maintained substantially lower than that of the liquid emulsion entering the cooling units.

The process in which a table spread results from the cooling of a water-in-oil emulsion is further characterized in that the oil is the minor component of the table spread and the aqueous phase represents 55% to 65% of the table spread. The table spread is still further characterized by the absence of milk or vegetable protein material.

We have discovered a novel means of achieving a water-in-oil relationship in the emulsion when the oil is present as the minor component and by this means can avoid spontaneous reversal of the emulsion into oil-in-water and into mixed types of emulsion. Anyone skilled in the art will recognize that when fat is a minor component of an emulsion, the fat is very prone to become the internal phase rather than the external phase.

It is an object of this invention to prepare a table spread having the customary water-in-oil phase-relationship wherein the oil is the minor component without using more than minimal quantities of conventional margarine emulsifiers, and wherein no ingredients, other than those ordinarily contained in butter or margarine-type table spreads, are required.

A still further object of this invention is to prepare a water-in-oil table spread that resembles butter or margarine in all respects such as appearance, body, color, flavor, keeping qualities and gustatory appeal.

Figure 1:
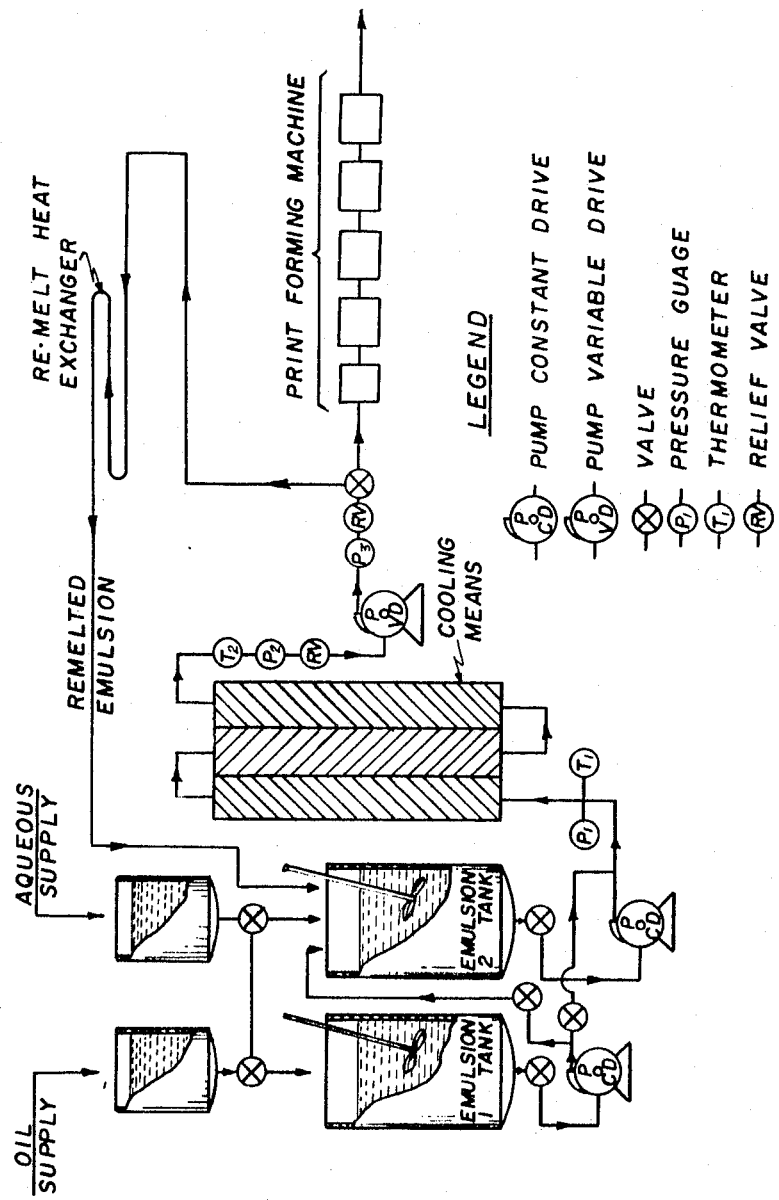
Figure 2:
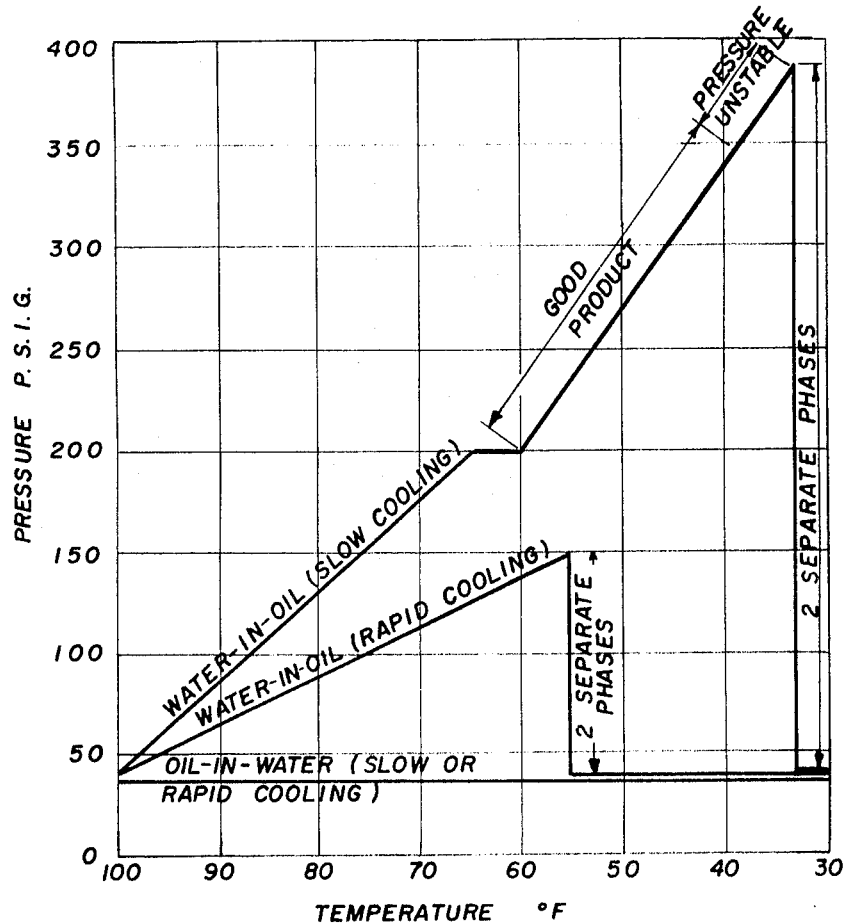

Other objects and features of this invention will become apparent by reference to FIGURES 1 and 2 as well as by the examples cited.

It is accepted terminology by those skilled in the art to refer to a margarine manufacturing process as being a continuous process although ingredients are proportioned by use of alternate supply tanks or tanks in sequence from which a continuous stream is supplied to the following processing equipment.

FIGURE 1 is a schematic drawing of the flow sequence of the processing equipment. In FIGURE 1 we have shown the cooling means as consisting of three separate units for ease of description. One or any other number of cooling units may be employed and this choice will be dictated by desired production rate.

A liquid water-in-oil emulsion is first formed in the emulsion tank by the slow addition of the desired proportion of the aqueous phase to the vigorously stirred oil component. A previously prepared batch of liquid emulsion is alternately or successively pumped from one or the other of two emulsion tanks into the first of a series of three cooling units, e.g., of the scraped-wall type; and through the remaining equipment and then back to the emulsion tank while the desired fat matrix is being formed during the start-up phase of our process. The rate of cooling in the first unit is such that the stream issuing at $T_2$ is lowered in temperature to about 70°–75° F. in about 0.5 to 2 minutes and until a resistance to circulation of about 150 p.s.i.g. develops at the entrance to the first cooling unit or first cooling stage. The recirculating stream during the second stage of our process mixes with previously cooled emulsion resulting from the preceding continuous flow through the train of units or stages. Thus, the cooled liquid during the second stage becomes partially gelled or crystallized by contact with the partially crystallized, flowable gel already present in the system from the first cooling stage. A critical requirement is that the stream during the second stage be maintained at 60°–65° F. for from 3 to 6 minutes before beginning the third cooling stage.

The temperature to be achieved at the end of the third stage of formation of the fat matrix is from 43° F. to 59° F. At this point, the inlet pressure ($P_1$) has risen to about 150–300 p.s.i.g. A pressure-reduction pump is utilized at the output of the cooling units to maintain and regulate pressure at the outlet at about 30 to 50 p.s.i.g. ($P_2$). After establishing the outlined start-up conditions, the recirculating stream is diverted to the printing machine. Additional oil component and additional aqueous component may be proportioned into another emulsion tank while the stream from the first emulsion tank is being formed and packaged. Thus, successive preparations of emulsion permit continuous production of the table spread. It is to be understood that it is also possible to divert only part of the exit stream to the printing machine while recycling the balance of the stream to the emulsion tank.

We have found that the use of a pressure-reduction pump is essential when pressures exceeding 350 p.s.i.g. ($P_1$) arise at the inlet to the cooling means as a result of rate of feed or from limiting dimensions and structure of the cooling means. It was found that pressures in excess of 350–400 p.s.i.g. in the cooling means result in a separated mixture of two separate phases, viz, a liquid aqueous phase and a solid fat phase, which are, of course, undesirable end products.

We also found that initial formation of the desired water-in-oil emulsion will not occur in any of the cooling stages unless cooling rates are carefully controlled during start-up as previously outlined. This is not true of the manufacture of a conventional table spread (margarine of 80% fat content) wherein no special procedure is required to initiate a water-in-oil relationship.

As previously described, during the cooling of the liquid emulsion and progressive crystallization in the successive cooling stages described for the start-up procedure, an attendant increase in pressure occurs at the inlet ($P_1$) to between 150 to 350 p.s.i.g., dependent upon the type of fat (degree of hardness or softness) used in the formulation, rate of pumping and structure of the cooling means. Poor synchronization between the rates of the pumps can, of course, create a pressure within the cooling units but it is to be understood that the pressure-reduction pump (P–VD) should always act to reduce exit pressure and never serve as an obstruction to flow created by the inlet pump (P–CD).

We have also discovered that pressures at $P_1$ (FIG. 1) in excess of 350–400 p.s.i.g. result in a separated, two-phase mixture with accompanying loss of pressure to 50–100 p.s.i.g. at the inlet. Pressures in excess of 350 p.s.i.g. also subject the equipment to an extra strain, even to the bursting point.

As part of our description of our invention, it may be well to enumerate other conditions which we have found to be inimical to the successful practice of our invention. These are: (1) inadequate agitation in the emulsion tank while slowly adding the aqueous component to the oil component, (2) too rapid addition of the aqueous phase to the forming water-in-oil emulsion, (3) the presence of milk protein in the aqueous phase.

FIGURE 2 graphically depicts the type of emulsion formed in practicing our invention and the end result under different conditions of time, temperature and pressure to be achieved during start-up. The parameters of time, temperature and pressure must fall within the ranges indicated in order to establish conditions for manufacture of our table spread. Furthermore, the first-formed, liquid emulsion to be delivered to the cooling means must be of the correct phase, viz; water-in-oil.

Shown also in FIGURE 2 are the undesirable results of rapidly cooling a water-in-oil emulsion and an oil-in-water emulsion. The undesirable end products that result are self-explanatory.

TABLE I.—CONDITIONS PREVAILING DURING ESTABLISHMENT OF INITIAL MATRIX AND LEADING TO CONTINUOUS PRODUCTION AT THIRD STAGE

| Transient Temp., °F. at $T_2$ | Desired water-in-oil Emulsion after Completion of Chilling Stage |
|---|---|
| 110–66 (First Stage) | Flowable Gel plus Liquid Emulsion ½ to 2 minutes 50–100 p.s.i.g. |
| 65–60 (Second Stage) | Flowable Gel 3 to 6 minutes 100–150 p.s.i.g. |
| 59–43 | Firmer Flowable Gel ½ to 2 minutes 150–350 p.s.i.g. Desirable continuous-state temperature and final product in this temperature range. |

Table I presents the nature of the product and the pressures which spontaneously develop when the liquid emulsion is cooled to the temperatures indicated at various periods of time.

An unusual feature of our invention is the demonstration that emulsifying agents in type and quantity as used in regular margarine need not be increased in making our novel product despite the markedly reduced ratio of fat to aqueous phase. Lecithin need not be added in an amount exceeding 0.5 percent by weight of the finished product of our invention and monoglyceride or monor- and diglycerides of fat-forming fatty acids need not be added in an amount exceeding 0.5% by weight of the finished product.

The following examples will serve to further illustrate the techniques required to successfully prepare a table spread wherein the minor component is the continuous fat phase and the major component is the dispersed aqueous phase.

Example I 358.5 pounds of liquid corn oil, 281.2 pounds of partially hydrogenated corn oil having a melting point of 101.6° F., iodine value of 70.8 and solid content index of 56.7, 41.4, 33.2, 14.3 and 2.0 at 50° F., 70° F., 80° F., and 92° F. and 102.0° F. respectively, and 63.3 pounds of a lightly hydrogenated corn oil having an iodine value of 89.3, solid content index of 16.7, 6.0, 1.2 and 0.0 at 50° F., 70° F., 80° F. and 92° F. respectively are blended together and 1.69 pounds soya lecithin, 1.13 pounds glyceryl monostearate, 0.07 pound carotene concentrate, 0.05 pound vitamin A concentrate and 0.025 pound vitamin D concentrate are dissolved in the blend. Properties of the oil blend are listed in Table II.

The aqueous phase is separately prepared by adding to 1,037 pounds of de-ionized and pasteurized water, 46.59 pounds of salt, 1.8 pounds of potassium sorbate and minor amounts of butter flavor and calcium, di-sodium EDTA (calcium, di-sodium ethylene diaminetetraacetate).

The prepared aqueous phase at 90° F. is then added to the vigorously agitated oil phase (initially at 120° F.) during a 12 minute interval. The total aqueous phase represents 60.5% of the whole emulsion. The resultant emulsion at 98° F. is pumped through an agitated cooling means, as depicted in FIGURE 1, through the pressure reducing pump and back to the emulsion tank until pressures and temperatures correspond to those shown in Table I as Third Stage. When these conditions are achieved, the product is diverted to the print-forming machine.

Operating conditions at the start-up of the process are as follows:

The temperature of the emulsion in the tank of FIGURE 1 is adjusted to 98° F. The pumps are started and the emulsion flows through the cooling units and back to the emulsion tank. Ammonia coolant is then gradually introduced to the cooling units during a 2-minute time interval at which time the temperature of the emulsion at the outlet of the last unit reaches 63° F. and the pressure reaches 130 p.s.i.g. Ammonia coolant back pressure at this time is 25 p.s.i.g. Further cooling is then delayed for 4 minutes during which time the outlet pressure increases to 180 p.s.i.g. Flow of ammonia coolant is then increased until the outlet temperature ($T_2$) is 46° F. and the inlet pressure ($P_1$) is 300 p.s.i.g. At this point the ammonia back-pressure is 15 p.s.i.g. The print-forming machine is then started when the stream of gelled emulsion is diverted to the print-forming machine and product is packaged on a continuous basis with $P_2$ being maintained at about 30 p.s.i.g. and $P_3$ at about 180 p.s.i.g. The product, after forming and wrapping as prints, is firm and dry and has the appearance and body of a table spread such as margarine or butter.

TABLE II.—THE INFLUENCE OF SOLID CONTENT INDEX ON PROCESSING TEMPERATURE $T_2$

| Example | Oil Blend | M.P., °F. | Solid Content Index of Blend | | | | $T_2$, °F |
|---|---|---|---|---|---|---|---|
| | | | 50° F. | 70° F. | 80° F. | 92° F. | |
| I | 51% Liquid Corn, 40% Partially Hyd. Corn, 9% Lightly Hyd. Corn. | 90.5 | 19.7 | 11.8 | 7.0 | 1.6 | 43–47 |
| II | 40.6% Liquid Safflower, 37.2% Partially Hyd. Soya, 22.2% Lightly Hyd. Cotton. | 23.0 | 20.9 | 13.3 | 8.6 | 2.4 | 48–49 |
| III | 53% Liquid Cotton, 47% Partially Hyd. Soya. | 96.0 | 24.9 | 15.5 | 10.6 | 3.6 | 53–60 |

Example II

A water-in-oil emulsion containing in the oil phase 285.4 pounds of liquid safflower oil, 261.5 pounds of partially hydrogenated soybean oil having a melting point of 105.5° F., iodine value of 68.1; solid content index of 62.3, 43.0 and 24.5 at 50° F., 80° F. and 92° F. respectively and 156.1 pounds of lightly hydrogenated cottonseed oil having a melting point of 89.0° F., iodine value of 85.5; solid content index of 14.8, 7.0, 4.0, 0.3 at 50° F., 70° F., 80° F. and 92° F. respectively is prepared as in Example I. This blend is appreciably firmer than that cited in Example I, as is shown in Table II. The aqueous phase is similar to that of Example I and the emulsion is prepared similarly. The start-up or initial processing conditions using 2 pumps in parallel to supply 2 print-forming machines are as follows:

The temperature of the emulsion in the tank is adjusted to 95° F. After starting flow of the emulsion to the cooling means, the coolant is gradually introduced during a 1 minute interval at which time the temperature of the emulsion at the outlet of the cooling means reaches 65° F. and the pressure reaches 160 p.s.i.g. Further cooling is then delayed for 3 minutes during which time the pressure increases to 210 p.s.i.g. Flow of coolant is then increased until the outlet temperature of the emulsion reaches 50° F. and the pressure ($P_1$) is 260 p.s.i.g. The ammonia coolant pressure is 20 p.s.i.g. The product is then diverted to the print-forming machines and the product is packaged on a continuous basis while $P_2$ is held at about 30 p.s.i.g. and $P_3$ is about 210 p.s.i.g. by adjustment of the speed of the pressure-reducing pump, P–VD. The product from each print-forming machine is firm and dry and quite satisfactory.

Example III

An oil blend containing 372.6 pounds of liquid cottonseed oil, and 330.4 pounds of partially hydrogenated soybean oil, the latter having a melting point of 105.5° F., iodine value of 68.1, soild content index of 62.3, 43.0 and 24.5, at 50° F., 80° F. and 92° F. respectively, is prepared containing all of the ingredients as in Examples I and II. The aqueous phase and the preparation of the emulsion are similar to Examples I and II. Properties of the oil blend are listed in Table II.

The temperature of the water-in-oil emulsion is adjusted to 100° F. After starting flow of the emulsion, the coolant is gradually introduced during a 2½-minute interval, after which time the temperature at the outlet of the cooling means reaches 60° F. and the pressure reaches 180 p.s.i.g. The outlet temperature is then held at 60° F. for 3 minutes, during which time the pressure ($P_1$) rises to 230 p.s.i.g. Cooling is then resumed until the temperature falls to 58° F. during a ½ minute period. The product is then diverted to the print-forming machine. During continued production pressure, ($P_2$), is maintained at about 50 p.s.i.g. and ($P_3$ is about 200 p.s.i.g. by adjustment of the speed of pump P–VD.

The margarine fats and the ratios of fats to water used in the examples are preferred. However, it is within the scope of the present invention to use any other margarine fat.

GENERAL DISCUSSION—PRINT FORM

The process conditions set forth above do not necessarily encompass the entire operable scope. The above conditions are some of the operating ranges for making a print form margarine.

A revision of FIGURE 1, now called FIGURE 3, is a schematic drawing of a more generalized flow sequence than that presented heretofore, of the equipment and of the process used in making the low-fat table spreads of our invention. In FIGURE 3 we have again shown the cooling means as consisting of three separate units for ease of description. One or any other number of cooling units may be employed and this choice will be dictated by desired production rate.

The process for the production of solid prints or sticks of our table spread is as follows:

A liquid water-in-oil emulsion is first formed in the emulsion tank by the slow addition of the desired proportion of the aqueous phase substantially free of protein, at about 60° to 95° F. to the vigorously stirred fat component at about 110° to 125° F. A previously prepared batch of liquid emulsion at about 90° to 110° F. is alternately or successively pumped from one or the other of two emulsion tanks into the first of a series of three cooling units, e.g., of the scraped-wall type, and through the remaining equipment and then back through a remelt heat exchanger to the emulsion tank. In this way, the product in the emulsion tank is maintained at about 90° to 110° F., while the desired fat matrix is being formed in the processing equpment thereafter. The rate of cooling in the first stage is such that the stream issuing at $T_2$ is lowered in temperature to about 75° to 50° F. in about 0.5 to 2 minutes and the initial pressure of about 50 p.s.i.g. at $P_1$ rises to about 130 to 230 p.s.i.g. at the entrance to the first cooling unit or first cooling stage. The recirculating stream during the second stage of our process mixes with previously cooled emulsion resulting from the preceding continuous flow through the train of units or stages. Thus, the cooled liquid during the second stage becomes partially gelled or crystallized by contact with the partially crystallized, flowable gel already present in the system from the first cooling stage. A critical requirement is that the stream during the second stage of cooling be maintained at about 65° to 50° F. for about 3 to 6 minutes at $T_2$ before beginning the third cooling stage.

The temperature ($T_2$) to be achieved at the end of the third stage of formation of the fat matrix is from 60° to 40° F. At this point, the inlet pressure ($P_1$) has risen to about 150 to 350 p.s.i.g. in 0.5 to 2 minutes. The presure-reduction pump, which had been utilized in cooling Stages 1 and 2, operates now to maintain and regulate pressure at the outlet ($P_2$) at about 30 to 100 p.s.i.g. After establishing the outlined start-up conditions, the chilled product stream is diverted to the printing machine; pressure at $P_3$ will vary from 150 to 250 p.s.i.g. Additional oil component and additional aqueous component may be proportioned into another emulsion tank while the stream from the first emulsion tank is being formed and packaged. Thus, successive preparation of emulsion permits continuous production of the table spread. It is to be understood that it is also possible to divert only part of the exit product stream to the printing machine while recycling the balance of the stream through the remelt heat exchanger to the emulsion tank. Pressure at the print forming machine ($P_4$) will vary between 3 to 5 p.s.i.g., and product temperature at $T_3$ will show an eventual total titer heat rise of about 12° to about 17° F.

An alternate method of preparing the emulsion has also been used. Both the oil component and the aqueous component may be proportioned simultaneously and run together into the emulsion tank to form a batch of emulsion by vigorous agitation. As this emulsion is used to form product, following the sequential cooling steps described above, the emulsion is replenished by simultaneously proportioning additional oil and aqueous components into the remaining emulsion. By this method the emulsion tank remains substantially full and emulsion formation may be considered a continuous operation.

We have found that the use of a pressure-reduction pump is essential when pressures exceeding 350 p.s.i.g. arise at the inlet ($P_1$) to the cooling means as a result of rate of feed or from limiting dimensions and structure of the cooling means. It was found that pressures in excess of 350 to 400 p.s.i.g. in the cooling means result in a broken emulsion of two separate phases, viz. a liquid aqueous phase and a solid fat phase, which are, of course, undesirable end products.

We have found that formation and maintenance of the desired water-in-oil emulsion to form solid product will not be achieved if any significant amount of protein is present in the aqueous phase and if cooling rates are not carefully controlled during start-up as previously outlined. When the low fat table spread is formulated so that the aqueous phase contains as little as 4% of the protein concentration in the aqueous phase of conventional margarine, emulsion reversal to the oil-in-water type occurs and such emulsions cannot be converted to a solid table spread. Rapid cooling of the water-in-oil emulsion, viz. to 45° F. within 0.5 to 2 minutes, results in a broken emulsion of two separate phases, a liquid aqueous phase and a solid fat phase. This undesirable change does not occur in the manufacture of a conventional table spread (margarine of 80% fat content with or without protein in the aqueous phase) wherein no special procedure is required to initiate and maintain a water-in-oil relationship.

As previously described, during the cooling of the liquid emulsion and progressive crystallization in the successive cooling stages described for the start-up procedure, an attendant increase in pressure occurs at the inlet ($P_1$) to between 150 to 350 p.s.i.g., dependent upon the type of fat (degree of hardness) used in the formulation, rate of pumping and structure of the cooling means. Poor synchronization between the rates of the pumps can, of course, create a pressure within the cooling units but it it to be understood that the pressure-reduction pump (P–VD) should always act to reduce exit pressure and never serve as an obstruction to flow created by the inlet pump (P–CD).

We have noted above that pressures at $P_1$ (FIG. 3) in excess of 350 to 400 p.s.i.g. result in a separated, two-phase mixture and this occurs with a subsequent loss of pressure shortly thereafter to 50 to 100 p.s.i.g. at the inlet. Pressures in excess of 350 p.s.i.g. also subject the equipment and lines to an extra strain, sometimes even to the bursting point.

The S.C.I. values of the total fat of our low-fat table spreads when packaged in print form, are within 15 to 25 at 50° F., 8.5 to 15.5 at 70° F., 5 to 10.5 at 80° F., and 0 to 3.5 at 92° F. The preferred ranges of the S.C.I. values for the total fat component of our low-fat table spreads are 16 to 21 at 50° F., 9 to 12 at 70° F., 5 to 7 at 80° F., and 0 to 1.5 at 92° F.

Table III presents the nature of the product and the pressures which develop at $P_1$ when the liquid emulsion is cooled to the temperatures indicated at various periods of time for the production of our table spread in print form.

TABLE III.—CONDITIONS PREVAILING DURING ESTABLISHMENT OF INITIAL MATRIX AND LEADING TO CONTINUOUS PRODUCTION AT THE THIRD STAGE FOR PRODUCING A PRODUCT IN PRINT FORM

| Transient Temperature at $T_2$ | Desired Water-in-Oil Emulsion after completion of Chilling State [1] |
|---|---|
| First Stage: (100°–99° F.)→ (75°–50° F.). | Liquid emulsion plus flowable gel; 0.5 to 2 minutes cooling; 50→130–230 p.s.i.g. at $P^1$. |
| Second Stage: 65°–50° F., holding. | Flowable gel; 3 to 6 minutes holding; 130–230 p.s.i.g. at $P^1$. |
| Third Stage: (65°–50° F.)→ (60°–40° F.). | Firmer but flowable gel; 0.5 to 2 minutes cooling; (130–230 p.s.i.g.)→(150–350 p.s.i.g.) at $P^1$. Desirable continuous-state temperature and pressure for printing product. |

[1] Throughout the chilling, holding, and packaging operations, pressures at $P^2$ must be held at about 30 to 100 p.s.i.g.

The following examples will serve to further illustrate the techniques required to successfully prepare a table spread in print form wherein the minor component is the continuous fat phase and the major component is the dispersed aqueous phase.

Example IV

An oil blend containing 372.6 pounds of liquid corn oil, 217.9 pounds of partially hydrogenated corn oil and 112.5 pounds of another partially hydrogenated corn oil, the former partially hydrogenated corn oil having a melting point of 100° F., iodine value of 71.2, solids content index of 46.0, 30.0, 21.0, and 5.0 at 50° F., 70° F., 80° F., and 92° F., respectively, and the latter partially hydrogenated corn oil having a melting point of 105.5° F., iodine value of 65, solids content index of 58.0, 43.0, 35.0, and 18 at 50° F., 70° F., 80° F., and 92° F., respectively, is prepared containing all the ingredients as in the previous examples. The solids content index of the oil blend is listed in Table IV. The aqueous phase is similar to that in the earlier examples. The emulsion is prepared by simultaneously proportioning both the oil and aqueous phases into the emulsion tank with vigorous agitation until a tank full of emulsion is obtained.

The temperature of the water-in-oil emulsion is adjusted to 100° F. The coolant is gradually introduced during a 2-minute interval, after which time the temperature at the outlet ($T_2$) of the cooling means reaches 53° to 54° F. and the pressure reaches 150 p.s.i.g. at $P_1$ (Stage 1, cooling). The outlet temperature is then held at 53° to 54° F. for 3 minutes, during which time the pressure at $P_1$ rises to 230 p.s.i.g. (Stage 2, holding). Cooling is then resumed until the temperature at $T_2$ falls to 45° to 47° F. during a 0.5 minute period; pressure is at 320 p.s.i.g. at $P_1$ (Stage 3, cooling). The product is then diverted to the print-forming machine. During continuous production, pressure at $P_2$ is maintained at about 50 to 60 p.s.i.g. and at $P_3$ is about 150 to 200 p.s.i.g. by adjustment of the speed of pump P–VD. Print-forming pressure ($P_4$) is 5 p.s.i.g. and print temperature at $T_3$ is 61° F. for an average titer heat rise of 15° F. When the level of emulsion falls to a predetermined level in the emulsion tank, the proportioning of the two streams automatically resumes to maintain an essentially full batch of emulsion. The low-fat table spread is an excellent product in exhibiting very good spreadability in the cold, good stand-up qualities at room temperature, and rapid melt-down in the mouth.

Example V

An oil blend containing 358.5 pounds of liquid corn oil and 344.5 pounds of partially hydrogenated corn oil, the latter having a melting point of 100° F., iodine value of 71.2, solids content index of 46.0, 30.0, 21.0, and 5.0 at 50° F., 70° F., 80° F., and 92° F., respectively, is prepared containing all of the ingredients as in the prior examples. The aqueous phase is similar to that in the earlier examples. The solids content index of the oil blend is listed in Table IV.

The temperature of the water-in-oil emulsion is adjusted to 100° F. After starting the flow of the emulsion, the coolant is gradually introduced during a 2-minute interval, after which time the temperature at the outlet of the cooling means at $T_2$ reaches 54° F. and the pressure reaches 180 p.s.i.g. at $P_1$ (Stage 1, cooling). The outlet temperature $T_2$ is then held at 54° F. for 4 minutes, during which time the pressure $P_1$ rises to 230 p.s.i.g. (Stage 2, holding). Cooling is then resumed until the temperature $T_2$ falls to 43° to 45° F. during a 0.5 minute period (Stage 3, cooling). The product is then diverted to the print-forming machine. During continued production, pressure at $P_1$ is maintained at 290 p.s.i.g., $P_2$ is maintained at about 50 p.s.i.g., and $P_3$ is about 200 p.s.i.g. by adjustment of the speed of pump P–VD. Print-forming pressure ($P_4$) is 4 p.s.i.g. and the temperature of the formed prints is 59° F., indicating an average titer heat rise of 15° F. The low-fat table spread is an excellent product in exhibiting very good spreadability in the cold, good stand-up qualities at room temperatures, and rapid melt-down in the mouth.

Example VI

A water-in-oil emulsion containing in the oil phase 358.5 pounds of liquid corn oil, 210.9 pounds of partially hydrogenated corn oil having a melting point of 105.5° F., iodine value of 65.0, solids content index of 58.0, 43.0, 35.0, and 18 at 50° F., 70° F., 80° F., and 92° F., respectively, and 133.6 pounds of lightly hydrogenated corn oil having an iodine value of 88, solids content index of 15.0, 5.5, 1.0, 0.1 at 50° F., 70° F., 80° F., and 92° F., respectively, is prepared as in the prior examples. This blend is appreciably softer than the others, described; the solids content index values of the oil blend are shown in Table IV. The aqueous phase is similar to that of the earlier examples and the emulsion is prepared like that of Example I. The start-up or initial processing conditions using 2 pumps in parallel to supply 2 print-forming machines are as follows:

The prepared aqueous phase at 90° F., is added to the vigorously agitated oil phase (initially at 120° F.) during a 12-minute interval. The temperature of the emulsion in the tank is then adjusted to 95° F. The emulsion is cooled during a 1-minute interval at which time the temperature of the emulsion at the outlet ($T_2$) of the cooling means reaches 60° F., and the pressure at $P_1$ reaches 160 p.s.i.g. (Stage 1, cooling). Further cooling is then delayed for 3 minutes during which time the pressure at $P_1$ increases to 210 p.s.i.g. (Stage 2, holding). Flow of coolant is then increased until the outlet temperature of the emulsion at $T_2$ reaches 40° to 42° F., and the pressure at $P_1$ is 320 p.s.i.g. The product is then diverted to the print-forming machines and the product is packaged on a continuous basis while $P_2$ is held at about 50 p.s.i.g. and $P_3$ is about 200 p.s.i.g. by adjustment of the speed of the pressure-reducing pumps, P–VD. Print-forming pressure ($P_4$) is 3 p.s.i.g. and print temperature ($T_3$) is 56° F. for an average titer heat rise of 15° F. The low-fat table spread is an acceptable product in being very spreadable at refrigeration temperatures, acceptable in stand-up at room temperatures, and good in melt-down in the mouth.

MANUFACTURE OF SOFT LOW-FAT TABLE SPREAD PACKED IN RIGID CONTAINERS

The process for the production of a soft but solid low-fat table spread of consistency suitable to be packed in tubs or other similar containers may deviate in one important respect from that described above for producing solid prints. The cooling stages as described in preparing the solid prints are not required. The water-in-oil emulsion is directly cooled to a temperature of about 68° to 58° F., intermediate between Stages 1 and 2 in the print-forming process. Inet pressure ($P_1$) to the cooling means rises to about 100 to 200 p.s.i.g. and the exit pressure ($P_2$) from the cooling means is maintained at about 30 to 100 p.s.i.g. The resulting flowable gel sets in the rigid container (the tub) to a non-flowable consistency within a few seconds to several minutes thereafter, depending upon the temperature of the fill and the firmness of the fat component. There is no need to superchill to the degree previously described in preparing prints, since the soft product, packed in its protective container with rigid walls, will set satisfactorily given time during refrigeration storage of about 40° to 55° F. Because of the lesser degree of superchilling, the eventual total titer heat rise in the tub-packed product amounts to only about 2° F. The tub-packed product must undergo this subsequent chilling stage during which the set-up fat serves to nucleate and promote crystallization of the fat still in liquid form and in contact with the established matrix. This rate of chilling in the refrigerator is so slow that no titer heat rise can be measured. In addition, the pressure at $P_3$ for the soft tub-packed product is preferably much less than that at $P_3$ in making prints. When the filling machine is taking the bulk of soft product for introduction into tubs, pressure at $P_3$ ranges from 25 to 100 p.s.i.g. and at $P_4$ it ranges from 10 to 25 p.s.i.g.

The formulation of the soft product, packed in rigid containers with structural strength, is the same as that described earlier for the product packed in print form, with the exception that the fat component is of a softer consistency.

The fat in the low-fat table spread of this invention has S.C.I. values as low as 8 at 50° F., 5 at 70° F., 2.5 at 80° F., and 0 at 92° F. It is amazing that, in such a low-fat table spread, there are only 2% solid fat and 98% liquid components at 70° F. and the product sets up as a solid product in the refrigerator and remains a solid of non-flowable consistency at the critical use temperature of about 70° F. under conditions of intermittent table use. The upper limits of S.C.I. values for the tub-packed product are 15 at 50° F., 8.5 at 70° F., 5.0 at 80° F., and 1.5 at 92° F.

The following example will serve to illustrate further the techniques required to successfully prepare a table spread in tub form wherein the minor component is the continuous fat phase and the major component is the dispersed aqueous phase.

Example VII

An oil blend containing 527.3 pounds of liquid corn oil and 175.8 pounds of partially hydrogenated corn oil, the latter having a melting point of 105.5° F., iodine value of 65.0, solids content index of 58.0, 43.0, 35.0, and 18 at 50° F., 70° F., 80° F., and 92° F., respectively, is prepared containing all the ingredients as in the prior examples. The aqueous phase is similar to that of the earlier examples. The emulsion is prepared by simultaneously proportioning together both the oil and aqueous phases into the emulsion tank with vigorous agitation until the tank is filled with a water-in-oil emulsion, as in Example 4. The temperature of the emulsion is adjusted to 95° F. and then cooled directly to a temperature at $T_2$ of 62° to 64° F. When the temperature at the outlet of the cooling means ($T_2$) reaches 64° F., the product is diverted to a conventional rotary-spout tub-filling machine (Stage 1, cooling). During continued production, pressure ($P_1$) is about 130 p.s.i.g. and pressure ($P_2$) is maintained at about 70 to 80 p.s.i.g. Pressure at $P_3$ is about 80 p.s.i.g. Pressure in the filling machine at $P_4$ is maintained at about 15 to 18 p.s.i.g. The resulting flowable gel sets in the rigid container (the tub) to a non-flowable consistency within one minute. Because of the lesser degree of superchilling, the titer heat rise in this product is only about 2° F. During the subsequent storage of the tub product in the refrigerator (Stage 2, holding; and Stage 3, chilling) the crystallization of the fat is completed. The low-fat table spread in tub form is an excellent product in being very spreadable in the cold, in having good stand-up qualities at room temperatures, and in melting down rapidly in the mouth.

Table IV sets forth in tabular form the solids content index values of the examples for ease of comparison.

TABLE IV.—INFLUENCE OF SOLIDS CONTENT INDEX OF THE FAT AND OF THE FORM OF THE LOW-FAT TABLE SPREAD [1] ON PROCESSING TEMPERATURE AT $T_2$ AT TIME OF PACKAGING

| Example No. | Solids Content Index at— | | | | $T_2$, ° F. | End-Product |
|---|---|---|---|---|---|---|
| | 50° F. | 70° F. | 80° F. | 92° F. | | |
| 3 | 24.9 | 15.5 | 10.5 | 3.5 | 54–60 | Prints. |
| 2 | 20.9 | 13.3 | 8.6 | 2.4 | 48–49 | Do. |
| 1 | 19.7 | 11.8 | 7.0 | 1.5 | 43–47 | Do. |
| 4 | 19.7 | 11.2 | 6.1 | 0.8 | 45–47 | Do. |
| 5 | 20.3 | 10.8 | 5.3 | 0.3 | 43–45 | Do. |
| 6 | 15.8 | 8.8 | 5.0 | 0.9 | 40–42 | Do. |
| 7 | 10.8 | 6.2 | 3.4 | 0.6 | 62–64 | Tubs. |

[1] Examples arranged in this table in descending order of firmness of the refrigerated product after having been brought to room temperature (70° F.).

TABLE V.—DEMONSTRATION OF THE SURPRISINGLY LOW AMOUNT OF SOLID FAT REQUIRED IN MAKING THE LOW-FAT TABLE SPREADS OF THIS INVENTION

| Product | Solid Fat Index [2] of the Product at— | | | |
|---|---|---|---|---|
| | 50° F. | 70° F. | 80° F. | 92° F. |
| A. Total margarine fat in conventional margarine | 22.9 | 14.3 | 9.6 | 2.5 |
| B. Margarine product of 80% fat content [1] | 18.3 | 11.4 | 7.7 | 2.0 |
| C. Low-fat table spread of 40% fat—expected values | 18.3 | 11.4 | 7.7 | 2.0 |
| D. Total fat component of the low-fat table spread, C above—expected values | 45.8 | 28.5 | 19.3 | 5.0 |
| E. Total fat component of our (40%) low-fat table spread—found values | 20.3 | 10.8 | 5.3 | 0.3 |
| F. Our typical low-fat table spread—found values | 8.1 | 4.3 | 2.1 | 0.1 |

[1] Product made predominantly with liquid corn oil, viz a preferred Example (No. 11) in the D. Melnick and F. H. Luckmann U.S. Patent No. 2,955,039.
[2] This is the same as the Solids Content Index (S.C.I.).

GENERAL DISCUSSION

Our process involves continuously manufacturing a low-fat table spread wherein an initially established matrix of a margarine fat containing a dispersed aqueous phase substantially free of protein, is thereafter caused to perpetuate itself by allowing the set-up fat on further chilling to nucleate and promote crystallization of fat still in liquid form and in contact with the established matrix; said process is also characterized by the pressure of the plastic emulsion issuing from the cooling units being maintained substantially lower than that of the liquid emulsion entering the cooling units.

Basically, two components are blended in making the products of this invention, in accordance with the processes described. One is an aqueous phase which is substantially free of any proteinaceous material and the other is a margarine-type oil of specific properties. In the aqueous phase, salt may be added up to 4%, as well as butter flavorings and approved preservatives such as ethylenediaminetetraacetate component, and potassium sorbate in small amounts. Protein as such or as part of the skim milk in the aqueous phase will reverse the emulsion to provide an undesirable oil-in-water type. The oil phase may contain added carotene coloring, vitamin A, emulsifiers and an oil-soluble chelating agent such as aminoisopropyl citrate. One feature of our invention is the demonstration that the emulsifying agents we employ are in type and quantity the same as in regular margarine. Surprisingly, there proved to be no need to increase the concentration of emulsifying agents in making our novel product, despite the markedly high ratio of aqueous phase to fat. Lecithin need not be added in an amount exceeding 0.5% by weight and monoglycerides and/or diglycerides of the fat-forming fatty acids need not be added in an amount exceeding 0.5% by weight of the finished product. No ingredients, other than those which may be used in butter or margarine-type table spreads, need be added.

One of the most surprising aspects of our invention is the demonstration that exceedingly small amounts of solid fat are required to impart body to the low-fat table spreads of this invention. In the case of margarine, the only component which makes the product a solid at the critical use temperatures of about 70° F. is the solid fat in the margarine oil of the margarine. The water phase contributes no solids for this purpose. The solid fat content or index of a margarine oil, also referred to as the solids content index (S.C.I.) is determined by a dilatometric method; in the present invention, the procedure as described by Fulton and Associates (J.O.A.C., 31, 98, 1954) has been employed.

In Table V there are listed values demonstrating the surprisingly low amount of solid fat required in making the low-fat table spreads of this invention. A margarine fat, typical of that in current production is listed as item A in this table. This fat has the S.C.I. values shown in Table V. Since the margarine contains 80% fat, the margarine per se (item B) will contain, at each of the measuring temperatures, 80% of the solid fat figures previously listed. Only the solid fat in the total margarine fat contributes body to margarine. Hence, one would expect a low-fat table spread of 40% fat content to require at least the same solid fat concentrations as conventional margarine at each of the test temperatures in order to exhibit the same body characteristics (items B and C). Accepting this reasoning, one would then expect the total fat in the low-fat table spread of 40% fat content to have S.C.I. values like item D in Table V. However, such is not the case. As shown in Table IV, the S.C.I. values of item E—typical of the total fat in our low-fat table spread—are very much less than expected (compare item E with D in Table V). In fact, the S.C.I. values for the total fat in our low-fat table spreads are desirably less than those for the margarine fats of conventional margarines. Converting the S.C.I. values from a fat to the end-product basis gives figures (see item F) which are amazingly low. Despite the strikingly different values for the solid fat concentrations in regular margarine and in our low-fat table spreads (compare item F with B), the body of the low-fat table spreads is still about the same as that for conventional margarines of the preferred type. It is to be noted that there is present in our novel table spreads only about 1/3 as much solid fat at the critical use temperature of 70° F. and also at 80° F.

From the foregoing specification and examples, it is apparent that the product packaged in tub form is generally softer than the product packaged in print form. The overall S.C.I. values of the total fat of our low-fat table spreads packaged in either tub or print forms are within 8 to 25 at 50° F., 5 to 15.5 at 70° F., 2.5 to 10.5 at 80° F. and 0 to 3.5 at 92° F.

We claim:

1. An edible, low-fat, plastic table spread composition in the form of an emulsion of the water-in-fat type, consisting essentially of from about 55% to about 65% by weight of the spread of an aqueous phase that consists essentially of water with minor amounts of margarine-type flavorants and adjuvants, and that is free of protein content, and that is dispersed in a vegetable fat phase that forms from about 35% to about 45% of the spread by weight said vegetable fat having the following S.C.I. values:

At (° F.)—
| | |
|---|---|
| 50 | 8–25 |
| 70 | 5–15.5 |
| 80 | 2.5–10.5 |
| 92 | UP to 3.5 | said spread composition including therein about 1% by weight or less of a margarine-type emulsifier system.

2. A composition in accordance with claim 1, wherein the emulsifier is selected from the group consisting of lecithin, glyceryl monostearate, and mixtures thereof.

3. An edible low-fat, plastic table spread composition, in print form, consisting essentially of from about 55% to about 65% of an aqueous phase dispersed in about 45% to about 35% of a vegetable fat phase and containing about 1% or less of an emulsifier system by weight of the composition, the aqueous phase being subsentially free of protein, the fat phase providing the solid fat to make the spread composition a solid at the critical use temperature of about 70° F., the fat phase having S.C.I. values from 15 to 25 at 50° F., 8.5 to 15.5 at 70° F., 5 to 10.5 at 80° F., and 0 to 3.5 at 92° F., and the emulsifier system consisting of lecithin and glyceryl monostearate.

4. An edible, low-fat, plastic table spread composition, in tub form, consisting essentially of from about 55% to about 65% of an aqueous phase dispersed in about 45% to about 35% of a vegetable fat phase, and about 1% or less of an emulsifier system by weight of the composition, the aqueous phase being substantially free of protein and the fat phase providing the solid fat to make the said spread a soft solid product of non-flowable but spreadable consistency at the critical use temperature of about 70° F., said fat phase having S.C.I. values from 8 to 15 at 50° F., 5 to 8.5 at 70° F., 2.5 to 5 at 80° F., and 0 to 1.5 at 92° F., and the emulsifier system consisting of lecithin and glyceryl monostearate.

(References on following page)

References Cited

UNITED STATES PATENTS

| | | | |
|---|---|---|---|
| 2,220,976 | 11/1940 | Schou | 99—123 |
| 2,422,633 | 6/1947 | Petersen | 99—123 |
| 2,508,393 | 5/1950 | Jaeger | 99—123 |
| 2,921,855 | 1/1960 | Melnick et al. | 99—122 |
| 2,955,039 | 10/1960 | Melnick et al. | 99—122 |
| 3,360,378 | 12/1967 | Spitzer et al. | 99—123 |

OTHER REFERENCES

"Journal of Dairy Science," vol. 46, No. 4, April 1963, p. 363.

MAURICE W. GREENSTEIN, Primary Examiner